United States Patent
Gross et al.

(10) Patent No.: US 9,342,764 B1
(45) Date of Patent: May 17, 2016

(54) METHODS AND SYSTEMS FOR PERFORMING QUEUE-BASED ROUTING OF PRINT JOBS IN A MULTI-SITE PRINT PRODUCTION ENVIRONMENT

(71) Applicant: Xerox Corporation, Norwalk, CT (US)

(72) Inventors: Eric Michael Gross, Rochester, NY (US); Tulia Plumettaz, Cambridge, MA (US); Pallavi Manohar, Maharashtra (IN); Manoj Gupta, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/666,663

(22) Filed: Mar. 24, 2015

(51) Int. Cl.
*G06F 3/12* (2006.01)
*G06K 15/02* (2006.01)

(52) U.S. Cl.
CPC .................. *G06K 15/1806* (2013.01)

(58) Field of Classification Search
None
See application file for complete search history.

(56) References Cited

U.S. PATENT DOCUMENTS

| | | | | |
|---|---|---|---|---|
| 7,499,766 B2 * | 3/2009 | Knight | G06Q 10/087 700/107 |
| 7,542,161 B2 * | 6/2009 | Lin | G06F 3/1214 358/1.12 |
| 7,804,611 B2 * | 9/2010 | Castellani | G06F 3/1208 358/1.15 |
| 8,059,292 B2 * | 11/2011 | Rai | G06Q 10/06 358/1.13 |
| 8,120,801 B2 * | 2/2012 | Zhang | G06F 3/1208 358/1.13 |
| 8,127,012 B2 * | 2/2012 | Rai | G06Q 10/06 358/1.15 |
| 8,237,964 B2 * | 8/2012 | Fan | G06F 3/126 358/1.13 |
| 8,819,694 B2 * | 8/2014 | Corona | G06F 9/5044 358/1.13 |
| 2005/0231751 A1 * | 10/2005 | Wu | G06F 3/1208 358/1.15 |
| 2006/0055956 A1 * | 3/2006 | Takahashi | G06F 3/1211 358/1.13 |
| 2008/0080006 A1 * | 4/2008 | Paskalev | G06F 3/1217 358/1.18 |
| 2008/0174818 A1 * | 7/2008 | Kanamoto | G06F 3/1204 358/1.15 |
| 2012/0062911 A1 * | 3/2012 | Robinson | H04N 1/00204 358/1.9 |
| 2012/0062933 A1 * | 3/2012 | Zeng | G06F 3/1217 358/1.15 |
| 2013/0163033 A1 * | 6/2013 | Sandler | G06F 3/1208 358/1.15 |

* cited by examiner

*Primary Examiner* — Ted Barnes
(74) *Attorney, Agent, or Firm* — Fox Rothschild LLP

(57) ABSTRACT

A system for performing queue-based routing of print jobs in a multi-site print production environment may include a computing device having a scheduling queue and a processor, and a computer-readable storage medium in communication with the computing device. The computer-readable storage medium may include one or more programming instructions that, when executed, cause the processor to receive a plurality of print jobs from one or more client computing devices, store the received print jobs in the scheduling queue, determine that a released print job has been released by a print production environment, identify a similar print job from the received print jobs in the scheduling queue, remove the identified similar print job from the scheduling queue, and route the identified similar print job to the print production environment.

13 Claims, 4 Drawing Sheets

METHODS AND SYSTEMS FOR PERFORMING QUEUE-BASED ROUTING OF PRINT JOBS IN A MULTI-SITE PRINT PRODUCTION ENVIRONMENT

BACKGROUND

In production control it is a common objective to control the work in process (WIP) level in a facility. This is achieved by a number of approaches such as, for example, Just in Time (JIT or Kanban) and Conwip (Constant WIP). Conwip operates by not releasing a production order into the system until a produced item leaves the system. In this way the WIP level is controlled and production on the floor is neither starved of work nor congested with work. In Kanban the same method is applied but at the station level. The methodology caps the WIP level to appropriate values which improves decision making flexibility on the floor. It also tends to reduce shop floor cycle time, and promotes improved quality (since quality issues that arise under suitably low WIP levels tend to amplify production halts and thereby provide the necessary pressure to drive production improvements).

However, Conwip or JIT production methods are not directly applicable in extremely high variety job environments, such as multi-site print production environments, where, in some cases, each job may be unique.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system for performing queue-based routing of print jobs in a multi-site print production environment may include a computing device having a scheduling queue and a processor, and a computer-readable storage medium in communication with the computing device. The computer-readable storage medium may include one or more programming instructions that, when executed, cause the processor to receive a plurality of print jobs from one or more client computing devices, store the received print jobs in the scheduling queue, determine that a released print job has been released by a print production environment, and identify a similar print job from the received print jobs in the scheduling queue. The similar print job comprises a print job type and print job size that are similar to corresponding characteristics of the released print job. The method system may include one or more programming instructions that, when executed, cause the processor to remove the identified similar print job from the scheduling queue, and route the identified similar print job to the print production environment.

In an embodiment, a system for routing print jobs to a print production environment may include a computing device having a scheduling queue and a processor, where the computing device is in communication with a plurality of client computing devices and a plurality of print production environments. The system may also include a computer-readable storage medium in communication with the computing device. The computer-readable storage medium may include one or more programming instructions that, when executed, cause the processor to receive a plurality of print jobs from one or more client computing devices, store the received print jobs in the scheduling queue, determine that a released print job has been released by a print production environment, and identify a similar print job from the received print jobs in the scheduling queue. The similar print job may include a print job type and print job size that are similar to corresponding characteristics of the released print job. The computer-readable storage medium may include one or more programming instructions that, when executed, cause the processor to remove the identified similar print job from the scheduling queue, and route the identified similar print job to the print production environment.

In an embodiment, a method of performing queue-based routing of print jobs in a multi-site print production environment may include, by one or more processors, receiving a plurality of print jobs from one or more client computing devices, storing the received print jobs in the scheduling queue, determining that a released print job has been released by a print production environment and identifying a similar print job from the received print jobs in the scheduling queue. The similar print job may include a print job type and print job size that are similar to corresponding characteristics of the released print job. The method may include removing the identified similar print job from the scheduling queue, and routing the identified similar print job to the print production environment.

DETAILED DESCRIPTION

Figure 1:
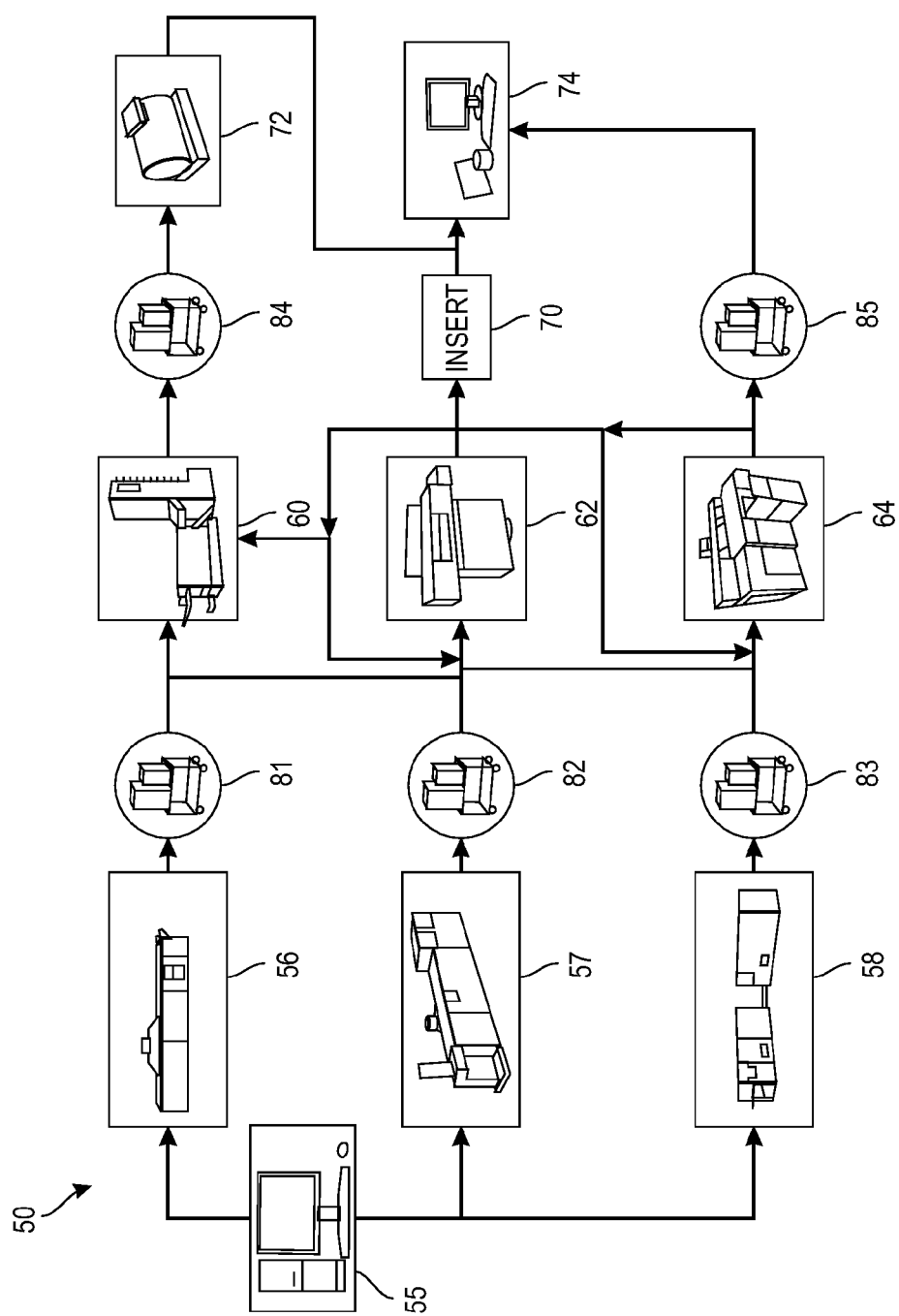
FIG. 1 shows an example of a production environment according to an embodiment.

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like.

A "job" refers to a logical unit of work that is to be completed for a customer.

A "job function" refers to one or more processing steps associated with processing a job. In a print production environment, a "print job function" refers to one or more processing steps associated with processing a print job. Example print job functions may include, without limitation, printing, binding, collating, scanning and/or the like.

A "job size" refers to a quantity of a job to be processed. In a print production environment, a "print job size" refers to a quantity of a print job to be processed, such as, for example, a number of pages, a number of impressions, a number of units and/or the like.

A "job type" refers to a combination of one or more job functions required to process a job. In a print production environment, a "print job type" refers to a combination of one or more print job functions required to process a print job.

A "multi-site production environment" refers to two or more production environments in communication with a computing device, where the production environments and computing device are located remotely from one another. The production environments may be remote from each other but may be geographically collocated. For example, production environments may be located in the same building. In other embodiments, production environments may be separated by geographic distances.

A "print job" refers to a job processed in a print shop.

A "print production resource" may be a physical device capable of processing at least a portion of a print job. Example print production resources may include black-and-white printers, color-printers, scanners, inserters, collators, binders, cutters, multi-function devices and/or the like.

A "print shop" refers to a grouping of one or more document production resources, such as printers, cutters, collators and the like. Example print shops include, without limitation, a printing service provider, or it may be a document production group within a corporation or other entity, such as a work area that contains one or more printers. Additionally, a print shop may communicate with one or more servers or other electronic devices by way of a local area network or a wide area network, such as the Internet, the World Wide Web or the like.

A "resource" is a physical device capable of processing at least a portion of a job.

A "scheduling queue" is a data structure configured to temporarily store information, including, but not limited to, a print jobs that are to be scheduled. A scheduling queue may be implemented as a hardware queue.

FIG. 1 shows an example of a production environment 50, in this case, example elements of a print production environment or print shop, according to an embodiment. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Figure 2:
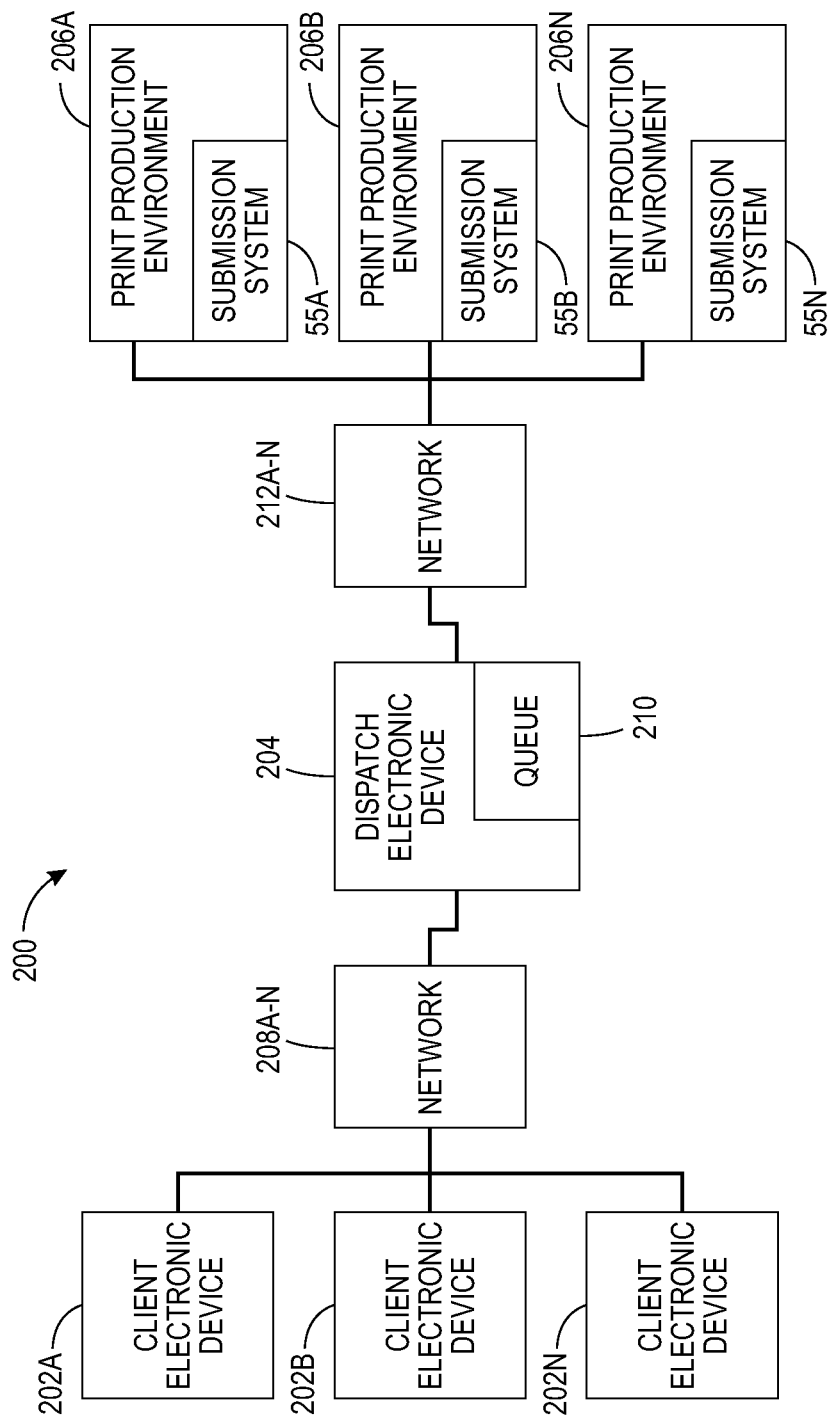
FIG. 2 illustrates an example of a multi-site production environment according to an embodiment.

FIG. 2 illustrates an example of a multi-site production environment, in this case a multi-site print production environment, according to an embodiment. As illustrated by FIG. 2, a multi-site production environment 200 may include one or more client electronic devices 202a-N, a dispatch electronic device 204, and a plurality of print production environments 206a-N.

In an embodiment, a client electronic device may receive one or more jobs to be processed that are associated with a particular client. For instance, client electronic device 202a may receive jobs from Client A or customers of Client A, and client electronic device 202b may receive jobs from Client B or customers of Client B.

In various embodiments, one or more of the client electronic devices 202a-N may be in communication with a dispatch electronic device 204 via one or more communication networks 208a-N. A communication network 208a-N may be a local area network (LAN), a wide area network (WAN), a mobile or cellular communication network, an extranet, an intranet, the Internet and/or the like.

A client electronic device 202a-N may send one or more jobs to the dispatch electronic device 204 for scheduling and routing to one or more print production environments 206a-N. The dispatch electronic device 204 may receive one or more jobs and may store the jobs in a scheduling queue or buffer 210 before routing the jobs to one or more print production environments 206a-N.

In various embodiments, the dispatch electronic device 204 may be in communication with one or more print production environments 206a-N via one or more communication networks 212a-N. A communication network 212a-N may be a local area network (LAN), a wide area network (WAN), a mobile or cellular communication network, an extranet, an intranet, the Internet and/or the like.

As illustrated by FIG. 2, a print production environment 206a-N may include an electronic submission system 55a-N. An electronic submission system 55a-N may receive one or more jobs from the dispatch electronic device 204, and may route the received jobs to one or more production resources in the print production environment 206a-N.

In various embodiments, one or more client electronic devices 202a-N and one or more print production environments 206a-N may be located remotely from one another and remotely from the dispatch electronic device 204. For instance client electronic device 202a may be located at Location A, client electronic device 202b may be located at Location B and client electronic device 202N may be located at Location C. The dispatch electronic device 204 may be located at Location D, and print production environments 206a-N may be located at Location E, Location F and Location G, respectively. The locations may be different geographic locations such as, for example, different rooms, departments, floors, buildings, counties, cities, towns, states and/or the like. Additional and/or alternate location configurations may be used within the scope of this disclosure.

Multi-site print production environments may encounter a large variability in print job types and print job sizes. In a multi-site print production system, there may be many print production environments to which a print job may be dispatched and completed. After a print job is completed at a particular print production environment, it may be efficient to release a subsequently-received identical such print job into the same print production environment so as to regulate the job variability within the print production environment. However there will seldom be an identical job that can be released. As a result, a dispatch electronic device may identify similar print jobs, and may route these print jobs to the same print production environment in an effort to minimize job variability within the print production environment and maintain an approximate constant work in progress level.

Figure 3:
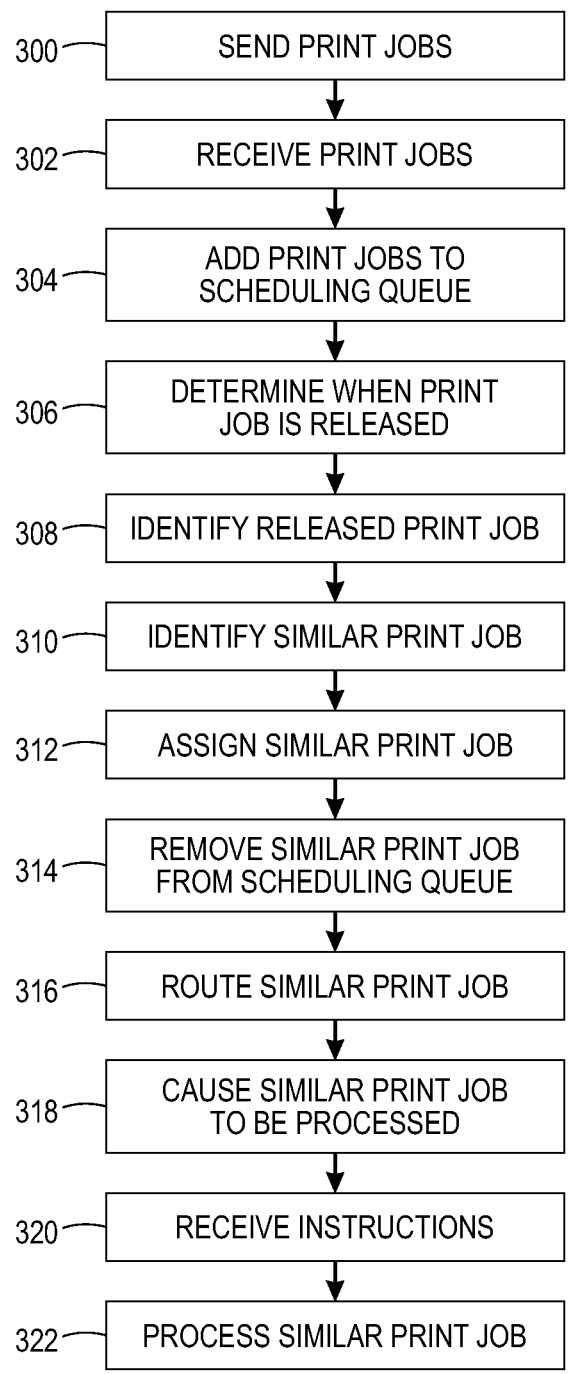
FIG. 3 illustrates a flow chart of an example method of dispatching one or more print jobs to one or more print production environments according to an embodiment.

FIG. 3 illustrates a flow chart of an example method of dispatching one or more print jobs to one or more print production environments according to an embodiment. As illustrated by FIG. 3, a client electronic device may send 300 one or more print jobs to a dispatch electronic device, and the dispatch electronic device may receive 302 the one or more print jobs. The dispatch electronic device may add 304 the received print jobs to an associated scheduling queue.

In an embodiment, the dispatch electronic device may determine 306 when a print job is released from a print production environment. A dispatch electronic device may monitor one or more print production environments to determine when a print job is completed and released by the print production environment. In another embodiment, a dispatch electronic device may receive a notification from a print production environment when a print job is completed and released by the print production environment.

The dispatch electronic device may identify 308 the released print job and may determine its print job type and/or print job size. In certain embodiments, a dispatch electronic device may identify 308 a released print job using a print job identifier, which may be a unique identifier associated with a print job. The dispatch electronic device may store information associated with one or more print jobs that it routes including, without limitation, a print job identifier, a print job type, a print job size, a print production environment to which the print job is routed and/or the like.

In response to determining 306 that a print job has been released from a print production environment, the dispatch electronic device may identify 310 a similar print job from its scheduling queue. A similar print job may be a print job that is similar with respect to print job type and/or print job size to the released print job.

In certain embodiments, the similarity of two print jobs may be evaluated using a similarity metric. A similarity metric may be a measurement or other indication of the similarity of two print jobs with respect to print job type and/or print job size. In an embodiment, a similarity metric may be represented by the following:

$$W1*(S_R-S_D)+W2*(JT_R-JT_D), \text{ where:}$$

| | | |
|---|---|---|
| R | = | released print job |
| D | = | print job to be dispatched from scheduling queue |
| $S_R$ | = | print job size of released print job |
| $S_D$ | = | print job size of print job to be dispatched |
| $JT_R$ | = | number of print job functions associated with released print job |
| $JT_D$ | = | number of print job functions associated with print job to be dispatched |
| W1 | = | a weight associated with the difference between $S_R$ and $S_D$ |
| W2 | = | a weight associated with the difference between $JT_R$ and $JT_D$ |

In an embodiment, the weights, W1 and W2, may represent a relative importance of differences in job size versus differences in job type or job functions. One or more weights may be selected empirically or by simulation. For example, an electronic device, such, for example, a dispatch electronic device, may simulate the behavior for a typical set of jobs and may vary the ratio of W1 to W2. The ratio that yields the best performance in terms of regulating WIP at each production environment may be selected.

A print job associated with a highest value similarity metric may be identified 310 as the similar print job. The dispatch electronic device may assign 312 the identified similar print job to the print production environment that completed the released print job. The dispatch electronic device may remove 314 the identified similar print job from its scheduling queue, and may route 316 the identified similar print job to the print production environment that completed the released job.

In certain embodiments, a dispatch electronic device may monitor a wait period of time for one or more print jobs that are in its scheduling queue. A wait period of time may be an amount of time that a print job has been in a scheduling queue. Once a wait period of time for a print job exceeds a threshold amount of time, the print job may be considered a prolonged print job. The dispatch electronic device may assign the prolonged print job to a print environment that releases a job that is similar to the prolonged print job. The dispatch electronic device may monitor released print jobs from one or more print production environments. The dispatch device may determine a similarity metric between one or more of the released print jobs and the prolonged print job. The dispatch electronic device may assign 312 the prolonged print job to the print production environment that released a print job having the highest similarity metric. The dispatch device may make this assignment even though the prolonged print job may not be the most similar print job in the scheduling queue to the released print job. The dispatch electronic device may remove 314 the prolonged print job from the scheduling queue, and may route 316 the prolonged print job to the print production environment.

In various embodiments, a dispatch electronic device may cause 318 one or more resources of an assigned print production environment to process a similar print job. For example, a dispatch electronic device may send one or more instructions to an assigned print production environment that instruct one or more resources of the print production environment to process the similar print job. Processing the similar print job may entail performing one or more processing steps that correspond to the print job type of the similar print job. For instance, if a similar print job has a print job type that requires printing and binding, the instructions sent to the assigned print production environment may include one or more instructions for one or more resources of the print production environment to perform printing and binding on the similar print job. Additional and/or alternate instructions, processes and print job types may be used within the scope of this disclosure.

The assigned print production environment may receive 320 one or more instructions from a dispatch electronic device, and may process 322 the similar print job accordingly.

Figure 4:
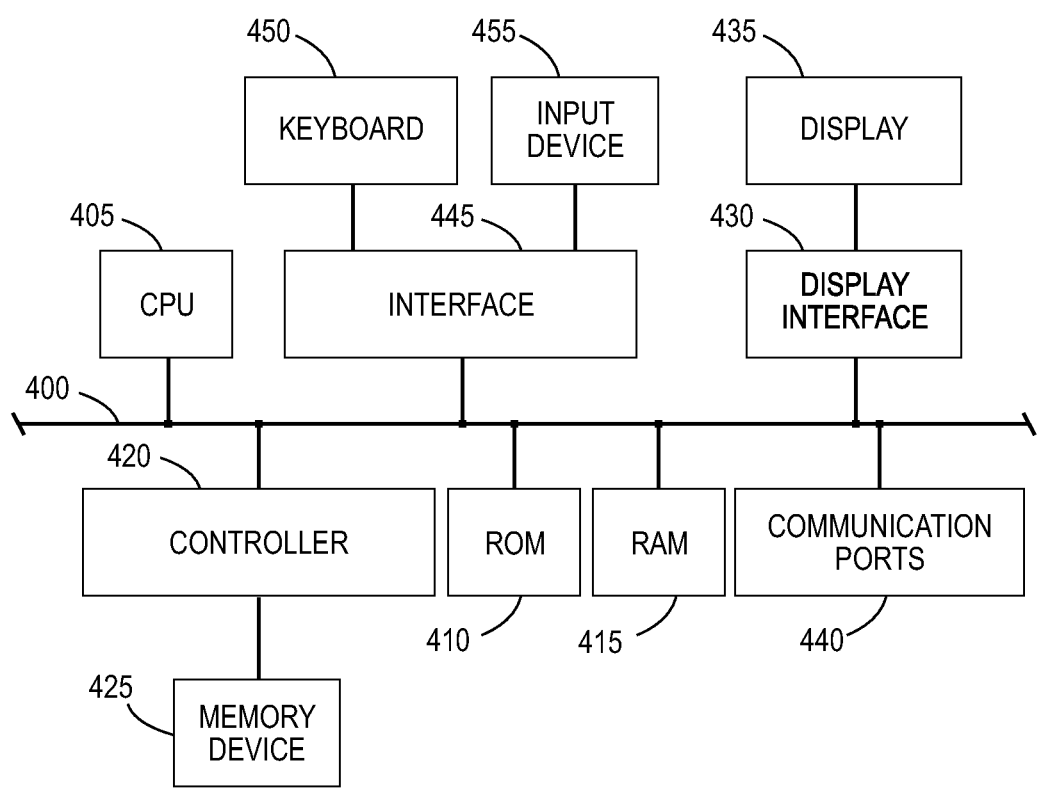
FIG. 4 illustrates a block diagram of example hardware that may be used to contain or implement program instructions according to an embodiment.

FIG. 4 depicts a block diagram of hardware that may be used to contain or implement program instructions. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an example of a production device, computing device or processor as such terms are used within this disclosure. Read only memory (ROM) 410 and random access memory (RAM) 415 constitute examples of non-transitory computer-readable storage media.

A controller 420 interfaces with one or more optional non-transitory computer-readable storage media 425 to the system bus 400. These storage media 425 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on a tangible, non-transitory computer-readable medium such as a compact disk, a digital disk, flash memory, a memory card, a USB drive, an optical disc storage medium and/or other recording medium.

An optional display interface 430 may permit information from the bus 400 to be displayed on the display 435 in audio, visual, graphic or alphanumeric format. Communication with external devices, such as a printing device, may occur using various communication ports 440. A communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A system for performing queue-based routing of print jobs in a multi-site print production environment, the system comprising:
    a computing device comprising a scheduling queue and a processor; and
    a non-transitory computer-readable storage medium in communication with the computing device, wherein the non-transitory computer-readable storage medium comprises one or more programming instructions that, when executed, cause the processor to:
        receive a plurality of print jobs from one or more client computing devices,
        store the received print jobs in the scheduling queue,
        determine that a released print job has been released by a print production environment,
        determine a first value that represents a number of print job functions associated with the released print job,
        determine a second value that represents a print job size associated with the released print job,
    for each print job in the scheduling queue:
        determine a third value that represents a number of print job functions associated with the print job;
        determine a fourth value that represents a print job size associated with the print job;
        determine a first weight;
        determine a second weight;
        determine a fifth value equal to a difference between the first value and the third value;
        determine a sixth value equal to a difference between the second value and the fourth value;
        determine a seventh value by multiplying the first weight by the fifth value;
        determine an eighth value by multiplying the second weight by the sixth value; and
        determine a similarity metric by summing the seventh value and the eighth value;
    identifying the print job having the highest similarity metric as the similar print job as a similar print job,
    remove the identified similar print job from the scheduling queue, and
    route the identified similar print job to the print production environment.

2. The system of claim 1, wherein the one or more programming instructions that, when executed, cause the processor to determine that a released print job has been released by a print production environment comprises one or more programming instructions that, when executed, cause the processor to receive a notification from the print production environment when the print production environment releases a print job.

3. The system of claim 1, wherein the one or more programming instructions that, when executed, cause the processor to determine that a released print job has been released by a print production environment comprises one or more programming instructions that, when executed, cause the processor to monitor the print production environment.

4. The system of claim 1, wherein the computing device is in communication with the print production environment and one or more other print production environments, wherein the print production environments are located remotely from one another.

5. The system of claim 1, wherein the one or more programming instructions that, when executed, cause the processor to identify a similar print job comprise one or more programming instructions that, when executed, cause the computing device to:
    determine whether any of the plurality of print jobs in the scheduling queue have a wait time that exceeds a threshold value, wherein the wait time represents an amount of time that the print job has been in the scheduling queue; and
    in response to determining that a print job from the plurality of print jobs has a wait time that exceeds the threshold value, identifying a print production environment from a plurality of print production environments in communication with the computing device that has a released a print job similar to the print job having the wait time that exceeds the threshold value.

6. The system of claim 1, wherein the computer-readable storage medium further comprises one or more programming instructions that, when executed, cause the computing device to cause one or more resources of the print production environment to process the similar print job by performing one or more processing steps that correspond to the print job type of the similar print job.

7. A system for routing print jobs to a print production environment, the system comprising:
    a computing device comprising a scheduling queue and a processor, wherein the computing device is in communication with a plurality of client computing devices and a plurality of print production environments; and
    a non-transitory computer-readable storage medium in communication with the computing device, wherein the non-transitory computer-readable storage medium comprises one or more programming instructions that, when executed, cause the processor to:
        receive a plurality of print jobs from one or more client computing devices,
        store the received print jobs in the scheduling queue,
        determine that a released print job has been released by a print production environment,
        determine a first value that represents a number of print job functions associated with the released print job,
        determine a second value that represents a print job size associated with the released print job, for each print job in the scheduling queue:
- determine a third value that represents a number of print job functions associated with the print job;
- determine a fourth value that represents a print job size associated with the print job;
- determine a first weight;
- determine a second weight;
- determine a fifth value equal to a difference between the first value and the third value;
- determine a sixth value equal to a difference between the second value and the fourth value;
- determine a seventh value by multiplying the first weight by the fifth value;
- determine an eighth value by multiplying the second weight by the sixth value; and
- determine a similarity metric by summing the seventh value and the eighth value;

identify the print job having the highest similarity metric, remove the identified similar print job from the scheduling queue, and route the identified similar print job to the print production environment;

wherein the similarity.

8. The system of claim 7, wherein the one or more programming instructions that, when executed, cause the processor to identify a similar print job comprise one or more programming instructions that, when executed, cause the computing device to:

determine whether any of the plurality of print jobs in the scheduling queue have a wait time that exceeds a threshold value, wherein the wait time represents an amount of time that the print job has been in the scheduling queue; and in response to determining that a print job from the plurality of print jobs has a wait time that exceeds the threshold value, identifying a print production environment from a plurality of print production environments in communication with the computing device that has a released a print job similar to the print job having the wait time that exceeds the threshold value.

9. A method of performing queue-based routing of print jobs in a multi-site print production environment, the method comprising, by one or more processors:

receiving a plurality of print jobs from one or more client computing devices;

storing the received print jobs in the scheduling queue;

determining that a released print job has been released by a print production environment;

determining a first value that represents a number of print job functions associated with the released print job;

determining a second value that represents a print job size associated with the released print job;

for each print job in the scheduling queue:
- determine a third value that represents a number of print job functions associated with the print job,
- determine a fourth value that represents a print job size associated with the print job,
- determine a first weight,
- determine a second weight,
- determine a fifth value equal to a difference between the first value and the third value,
- determine a sixth value equal to a difference between the second value and the fourth value,
- determine a seventh value by multiplying the first weight by the fifth value,
- determine an eighth value by multiplying the second weight by the sixth value, and
- determine a similarity metric by summing the seventh value and the eighth value;

identifying the print job having the highest similarity metric as a similar print job;

removing the identified similar print job from the scheduling queue; and routing the identified similar print job to the print production environment.

10. The method of claim 9, wherein determining that a released print job has been released by a print production environment comprises receiving a notification from the print production environment when the print production environment releases a print job.

11. The method of claim 9, wherein determining that a released print job has been released by a print production environment comprises monitoring the print production environment.

12. The method of claim 9, wherein identifying a similar print job comprises:

determining whether any of the plurality of print jobs in the scheduling queue have a wait time that exceeds a threshold value, wherein the wait time represents an amount of time that the print job has been in the scheduling queue; and in response to determining that a print job from the plurality of print jobs has a wait time that exceeds the threshold value, identifying a print production environment from a plurality of print production environments in communication with the computing device that has a released a print job similar to the print job having the wait time that exceeds the threshold value.

13. The method of claim 9, further comprising causing one or more resources of the print production environment to process the similar print job by performing one or more processing steps that correspond to the print job type of the similar print job.

* * * * *